United States Patent
Lombardi et al.

(10) Patent No.: US 9,667,871 B2
(45) Date of Patent: May 30, 2017

(54) REMOTE IMAGING IN MODULAR CELLULAR PHONE

(71) Applicant: Motorola Mobility LLC, Chicago, IL (US)

(72) Inventors: Michael J Lombardi, Lake Zurich, IL (US); Joseph L Allore, Mundelein, IL (US); Nathan M Connell, Glenview, IL (US); Paul Fordham, Wauconda, IL (US)

(73) Assignee: Motorola Mobility LLC, Chicago, IL (US)

( * ) Notice: Subject to any disclaimer, the term of this patent is extended or adjusted under 35 U.S.C. 154(b) by 4 days.

(21) Appl. No.: 14/663,521

(22) Filed: Mar. 20, 2015

(65) Prior Publication Data
US 2016/0277685 A1    Sep. 22, 2016

(51) Int. Cl.
H04N 5/232    (2006.01)
H04N 1/00    (2006.01)
H04N 5/225    (2006.01)

(52) U.S. Cl.
CPC ..... *H04N 5/23293* (2013.01); *H04N 1/00129* (2013.01); *H04N 1/00307* (2013.01); *H04N 5/2252* (2013.01); *H04N 5/23206* (2013.01)

(58) Field of Classification Search
CPC .... H04N 5/225; H04N 5/2252; H04N 5/2254; H04N 5/232; H04N 5/23203
See application file for complete search history.

(56) References Cited

U.S. PATENT DOCUMENTS

| | | | | |
|---|---|---|---|---|
| 7,636,518 B2* | 12/2009 | Tanaka | | G03B 17/14 |
| | | | | 348/211.14 |
| 7,957,765 B1* | 6/2011 | Causey | | H04M 1/0256 |
| | | | | 455/550.1 |
| 8,655,161 B1* | 2/2014 | Chen | | G03B 17/14 |
| | | | | 396/529 |
| 2011/0249073 A1* | 10/2011 | Cranfill | | H04N 7/147 |
| | | | | 348/14.02 |

(Continued)

FOREIGN PATENT DOCUMENTS

| | | |
|---|---|---|
| CN | 104378463 A | 2/2015 |
| WO | 0130078 A1 | 4/2001 |
| WO | 2014074869 A1 | 5/2014 |

OTHER PUBLICATIONS

Michael J. Lombardi, et al., "Antenna Tuning in a Modular Portable Communication Device", U.S. Appl. No. 14/625,682, filed Feb. 19, 2015.

(Continued)

*Primary Examiner* — Amy Hsu
(74) *Attorney, Agent, or Firm* — Miller, Matthias & Hull LLP

(57) ABSTRACT

A system and method of remote imaging allows a camera module in a modular portable electronic device environment to be removed from a base module without halting an image capture session being displayed on a display of the base module. In an embodiment, image data may be captured by both the camera module and the base module. A hardwired connection connects the devices when the camera module is docked on the base module, while a wireless connection maintains the connection between the devices when the camera module is undocked from the base module during an image capture session.

20 Claims, 6 Drawing Sheets

(56) References Cited

U.S. PATENT DOCUMENTS

| | | | |
|---|---|---|---|
| 2012/0262621 A1* | 10/2012 | Sato | G02B 13/06 |
| | | | 348/335 |
| 2014/0354868 A1* | 12/2014 | Desmarais | H04N 5/23293 |
| | | | 348/333.01 |
| 2014/0354888 A1* | 12/2014 | Nakamura | H04N 5/64 |
| | | | 348/725 |
| 2015/0029336 A1* | 1/2015 | Kucheryuk | H04N 7/183 |
| | | | 348/148 |
| 2015/0358513 A1* | 12/2015 | Yoshino | H04N 5/225 |
| | | | 348/374 |
| 2016/0065837 A1* | 3/2016 | Kim | H04N 5/23293 |
| | | | 348/211.2 |

OTHER PUBLICATIONS

Michael J. Lombardi, et al., "WiFi Connectivity in a Modular Portable Cellular Device", U.S. Appl. No. 14/663,716, filed Mar. 20, 2015.

Michael J. Lombardi, et al., "Voice Call Management in a Modular Smartphone", U.S. Appl. No. 14/688,361, filed Apr. 6, 2015.

Michael J. Lombardi, et al., "Adaptive Audio in Modular Portable Electronic Device", U.S. Appl. No. 14/737,990, filed Jun. 12, 2015.

\* cited by examiner

REMOTE IMAGING IN MODULAR CELLULAR PHONE

TECHNICAL FIELD

The present disclosure is related generally to mobile device configuration, and, more particularly, to a system and method for providing a remote imaging functionality for a modular portable communication device such as a cellular phone.

BACKGROUND

Portable communications devices such as high functionality (multi-function) cellular phones have become important tools for business as well as entertainment and pleasure. However, the more useful such a device becomes, the more likely the user is to carry the device. With this in mind, there is substantial interest in reducing the weight and thickness of such devices even as their capabilities continue to increase.

Component miniaturization and spatial efficiencies will continue to play important roles in this regard. In addition, device customization may be used to reduce the device footprint. For example, a user may wish to have a camera function but not a wireless speaker function; a device that has the former and lacks the latter can be provided, and will have a lower weight and thickness than a device having both features.

However, it is generally not practical for device manufacturers to maintain a large number of different production lines to supply differently-configured versions of the same base device. One approach that allows users to customize a completed device is a modular approach. With modularization, a base or primary device is produced and configured to be compatible with a number of secondary modules or devices that provide additional functions.

Thus, continuing with the example above, the primary device may include basic computing functionality and wireless communication capabilities, but may not include a camera function or a wireless speaker function. To serve the needs of various users, two secondary devices can be produced; the first secondary device may be a camera module and the second secondary device may be a wireless speaker module. By using the primary device coupled to the appropriate secondary module, each user is able to create a device that is customized to meet their needs.

While the present disclosure is directed to a system that can eliminate certain shortcomings or extend certain functions noted in this Background section, it should be appreciated that such a benefit is neither a limitation on the scope of the disclosed principles nor of the attached claims, except to the extent expressly noted in the claims. Additionally, the discussion of technology in this Background section is reflective of the inventors' own observations, considerations, and thoughts, and is in no way intended to accurately catalog or comprehensively summarize the art in the public domain. As such, the inventors expressly disclaim this section as admitted or assumed prior art with respect to the discussed details. Moreover, the identification herein of a desirable course of action reflects the inventors' own observations and ideas, and should not be assumed to indicate an art-recognized desirability.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Figure 1:
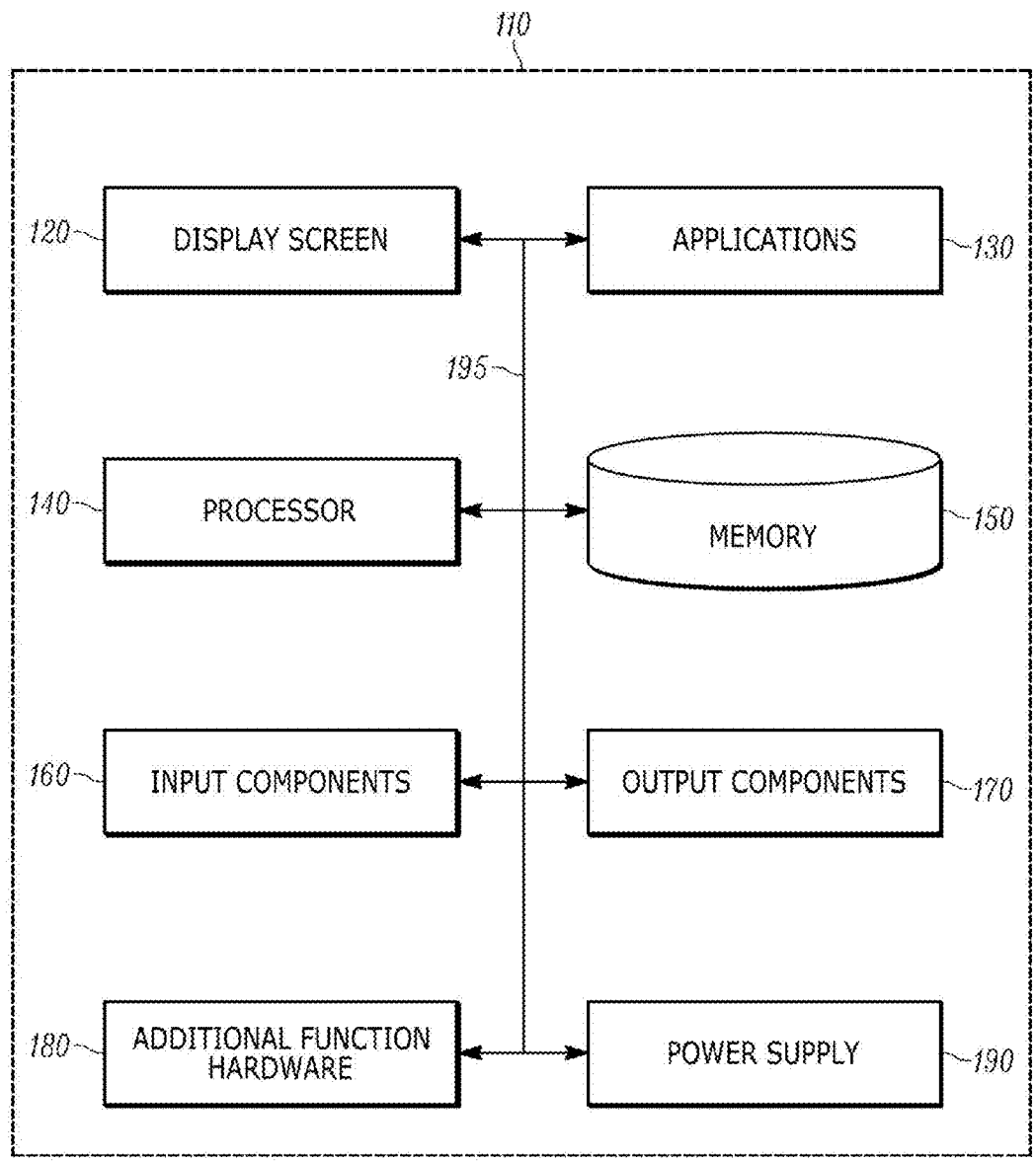
FIG. 1 is a simplified schematic of an example device with respect to which embodiments of the presently disclosed principles may be implemented.

Before presenting a full discussion of the disclosed principles, an overview of certain embodiments is given to aid the reader in understanding the later discussion. In an embodiment, a modular portable electronic device such as a cell phone is configured to be physically attached to a second device such that the combined device has greater functionality than either of the two devices alone.

The first device may include a display, touch screen, first interconnect, first microphone (mic), first image signal processor (ISP), first imager, first wireless data link, battery, processor and memory in an embodiment. Similarly, the second device may include a battery, second interconnect, second mic, processor, memory, second ISP, second wireless data link, and second imager.

In a further embodiment, in addition to being useful as an add-on module, the second device is usable in conjunction with the first device to provide remote imaging. The first device is able to configure its operation with respect to the second device based on the state of the second device. For example, the first device may detect that the second device is not physically connected to the first device, e.g., by sensing that the first interconnect is not mated to the second interconnect. In this case, the display and touch screen of the first device provide a user interface control and viewfinder for the imager of the second device via a wireless data link.

The wireless data link may be activated between the two devices when they are undocked after previously being docked through their respective interconnects. The wireless data link may have been previously established and simply activated from a low-power standby mode. If the act of undocking occurs while the user is using the viewfinder mode on the first device with respect to the imager of the second device, the live viewfinder may need to be paused by the first device while the wired connection switches to a wireless connection, and then resume operation once the transfer is completed.

However, in an embodiment, if video was being captured while the devices were physically connected, the capture of video may continue uninterrupted while the viewfinder data is being transferred to wireless. This is because the capture is being controlled by the second ISP and second imager. In another embodiment, a single video may be captured using simultaneous image data from the first imager and the second imager, and simultaneous audio data from the first microphone and the second microphone. To account for wireless latency, the image data may be synchronized by adding a delay to the image data of the first imager. Alternatively, image data captured by both imagers may be later aligned via a known wireless latency delay. If the latency delay is not known, it may be generated by correlating audio data from the first microphone with audio data from the second microphone.

With some or all of these techniques, the user is able to seamlessly initiate use of the second as a remote imager whose view is displayed as a viewfinder on the first device. With this overview in mind, and turning now to a more detailed discussion in conjunction with the attached figures, the techniques of the present disclosure are illustrated as being implemented in a suitable computing environment. The following device description is based on embodiments and examples of the disclosed principles and should not be taken as limiting the claims with regard to alternative embodiments that are not explicitly described herein. Thus, for example, while FIG. 1 illustrates an example mobile device within which embodiments of the disclosed principles may be implemented, it will be appreciated that other device types may be used, including but not limited to personal computers, tablet computers and other devices.

The schematic diagram of FIG. 1 shows an exemplary component group 110 forming part of an environment within which aspects of the present disclosure may be implemented. In particular, the component group 110 includes exemplary components that may be employed in a device corresponding to the first device and/or the second device. It will be appreciated that additional or alternative components may be used in a given implementation depending upon user preference, component availability, price point, and other considerations.

In the illustrated embodiment, the components 110 include a display screen 120, applications (e.g., programs) 130, a processor 140, a memory 150, one or more input components 160 such as speech and text input facilities, and one or more output components 170 such as text and audible output facilities, e.g., one or more speakers.

The processor 140 may be any of a microprocessor, microcomputer, application-specific integrated circuit, or the like. For example, the processor 140 can be implemented by one or more microprocessors or controllers from any desired family or manufacturer. Similarly, the memory 150 may reside on the same integrated circuit as the processor 140. Additionally or alternatively, the memory 150 may be accessed via a network, e.g., via cloud-based storage. The memory 150 may include a random access memory (i.e., Synchronous Dynamic Random Access Memory (SDRAM), Dynamic Random Access Memory (DRAM), RAMBUS Dynamic Random Access Memory (RDRM) or any other type of random access memory device). Additionally or alternatively, the memory 150 may include a read only memory (i.e., a hard drive, flash memory or any other desired type of memory device).

The information that is stored by the memory 150 can include program code associated with one or more operating systems or applications as well as informational data, e.g., program parameters, process data, etc. The operating system and applications are typically implemented via executable instructions stored in a non-transitory computer readable medium (e.g., memory 150) to control basic functions of the electronic device. Such functions may include, for example, interaction among various internal components and storage and retrieval of applications and data to and from the memory 150.

Further with respect to the applications 130, these typically utilize the operating system to provide more specific functionality, such as file system service and handling of protected and unprotected data stored in the memory 150. Although many applications may provide standard or required functionality of the user device 110, in other cases applications provide optional or specialized functionality, and may be supplied by third party vendors or the device manufacturer.

Finally, with respect to informational data, e.g., program parameters and process data, this non-executable information can be referenced, manipulated, or written by the operating system or an application. Such informational data can include, for example, data that are preprogrammed into the device during manufacture, data that are created by the device or added by the user, or any of a variety of types of information that are uploaded to, downloaded from, or otherwise accessed at servers or other devices with which the device is in communication during its ongoing operation.

The device having component group 110 may include software and hardware networking components 180 to allow communications to and from the device. Such networking components 180 will typically provide wireless networking functionality, although wired networking may additionally or alternatively be supported.

In an embodiment, a power supply 190, such as a battery or fuel cell, may be included for providing power to the device and its components 110. All or some of the internal components 110 communicate with one another by way of one or more shared or dedicated internal communication links 195, such as an internal bus.

In an embodiment, the device 110 is programmed such that the processor 140 and memory 150 interact with the other components of the device 110 to perform certain functions. The processor 140 may include or implement various modules and execute programs for initiating different activities such as launching an application, transferring data, and toggling through various graphical user interface objects (e.g., toggling through various display icons that are linked to executable applications).

Figure 2:
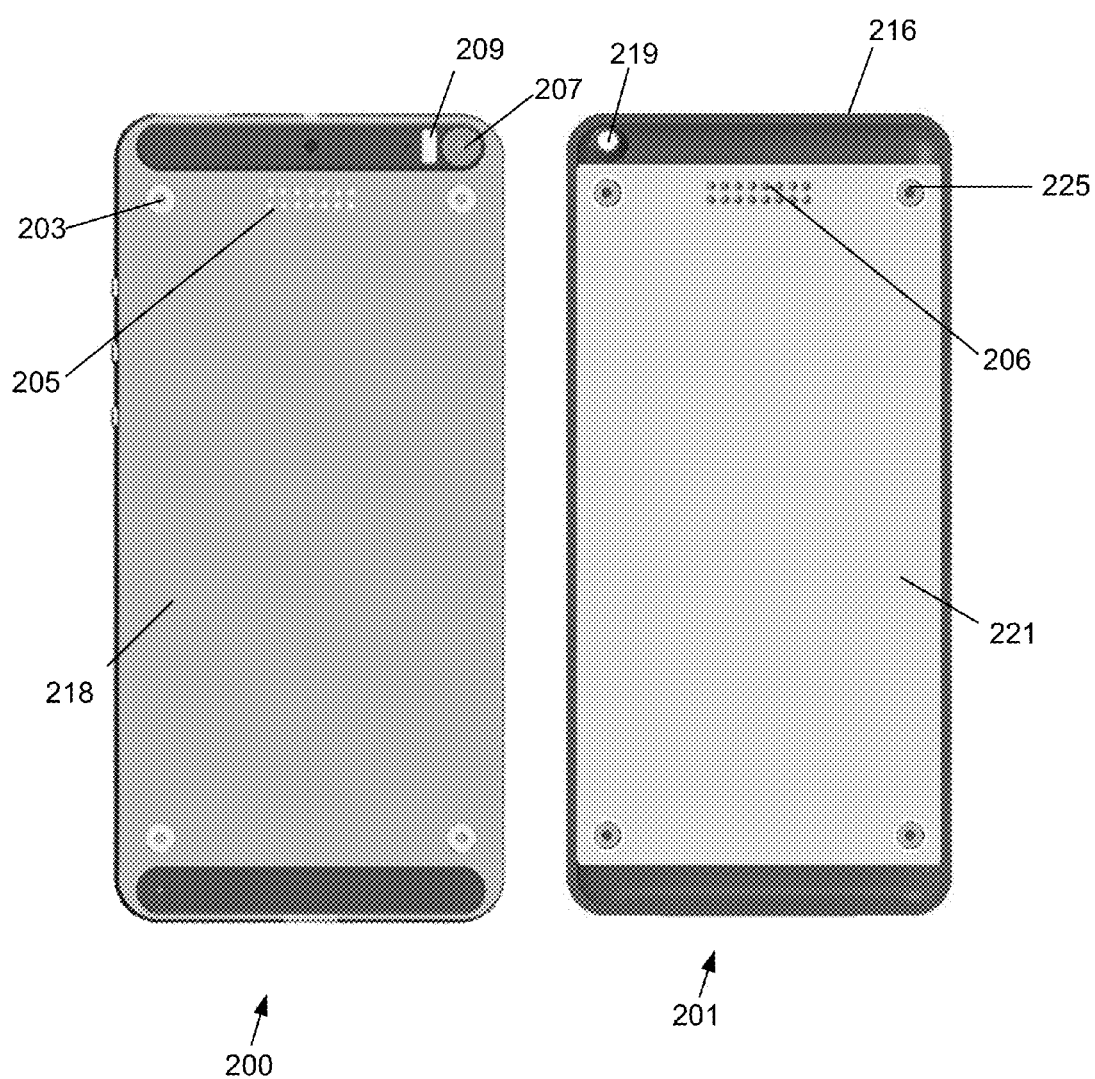
FIG. 2 is schematic view of a first device and a second device, showing the back of the first device and the back of the second device in accordance with an embodiment of the disclosed principles.

Turning to FIG. 2, this figure presents a view of a first device and a second device, showing the back of the first device and the back of the second device in accordance with an embodiment of the disclosed principles. In the illustrated example, the back 218 of the first device 200 includes one or more alignment features 203 configured and placed to mate with mating features 225 on the back 221 of the second device 201.

In addition, the back of the first device 200 in the illustrated embodiment includes a connector array 205. The connector array 205 is located and configured to mate with a mating connector array 206 on the back 221 of the second device 201. In the illustrated example, the back of the first device 200 further includes a built-in camera 207 and an associated flash 209. It will be appreciated that the first device 200 may include different features or additional features as compared to the illustrated embodiment.

In the illustrated example, the second device 201 provides at least an enhanced camera function. To this end, the second device 201 includes on its front face a camera 215 (see FIG. 4) and an associated flash. Further, in the illustrated example, use of the camera 215 of the second device 201 does not preclude the use of the camera 207 of the first device 200. As such, a hole 219 is provided in the second device 201 to allow a sight line for the camera 207 of the first device 200.

Figure 3:
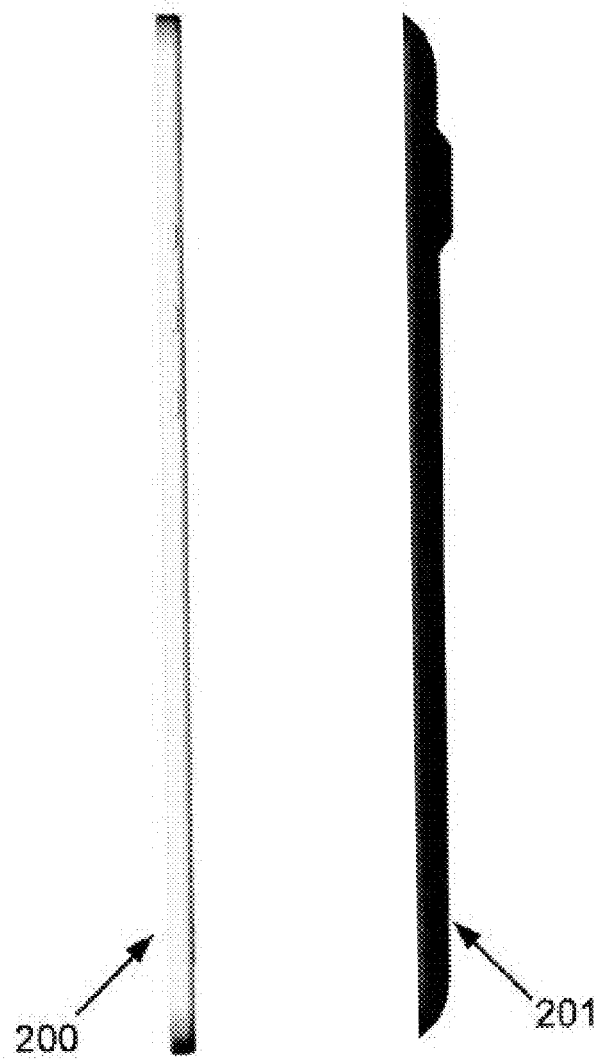
FIG. 3 is side view of the first device and the second device in accordance with an embodiment of the disclosed principles.
Figure 4:
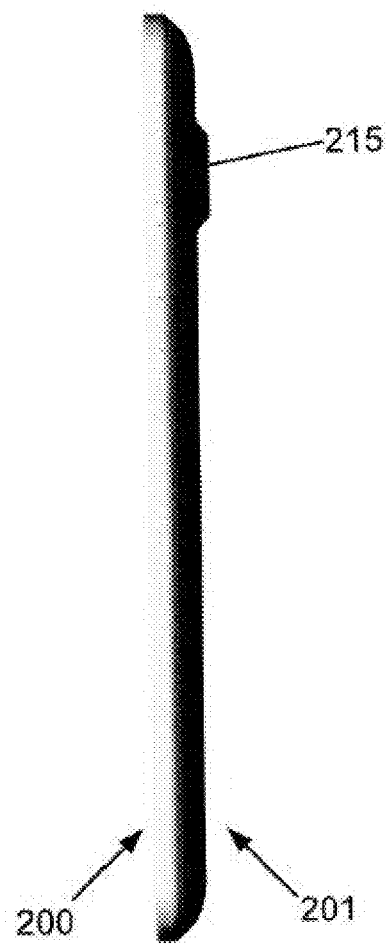
FIG. 4 is side view of the first device and the second device mated together via the back of the first device and the front of the second device in accordance with an embodiment of the disclosed principles.

FIG. 3 is a side view of the first device 200 and the second device 201, not yet mated together. Continuing, FIG. 4 is a side view of the first device 200 and the second device 201 mated together at the back of the first device 200 and the front of the second device 201 in accordance with an embodiment of the disclosed principles. As can be seen, the devices 200, 201 are in physical contact when mated. In should be noted that different embodiments of the second device 201 may vary significantly in thickness and shape from one another.

Figure 5:
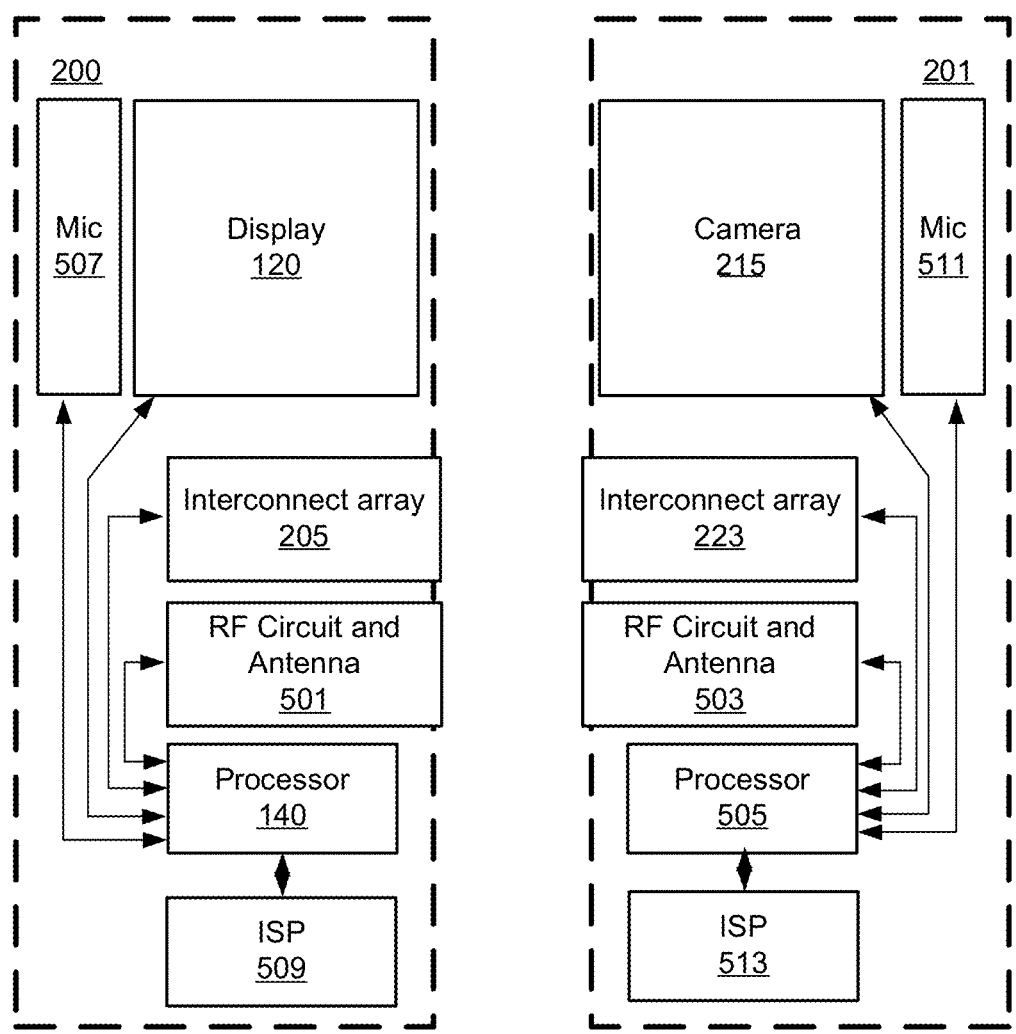
FIG. 5 is schematic diagram of a system for remote imaging in accordance with an embodiment of the disclosed principles.

Before discussing exemplary processes for remote imaging via a modular device, a schematic illustration of the topology of the first and second devices 200, 201 is given to assist in understanding the later-described process. In this regard, the schematic drawing of FIG. 5 illustrates the salient aspects of a modular device platform for remote imaging in keeping with an embodiment of the disclosed principles.

The illustrated schematic includes the first device 200 and the second device 201. Those of skill in the art will appreciate that while a portable communications device necessarily includes a great many parts, only certain elements are being shown in the illustrated schematic to enhance clarity.

The first device 200 as illustrated includes a processor such as processor 140 of FIG. 1, and a display or viewer such as display 120 of FIG. 1. In addition, the first device 200 includes the interconnect array 205 previously discussed with reference to FIG. 2. Also as noted above, the first device 200 may include a mic 507 and an ISP 509. Finally, a wireless communication facility such as an RF (radio frequency) circuit and antenna (collectively 501) is also included as part of the first device 200.

Similarly, the second device 201 includes at least a processor 505, a camera 215, e.g., a digital camera, the interconnect array 223 as discussed with reference to FIG. 2, and a wireless communication facility, e.g., RF circuit and antenna 503 (collectively). Additionally, a mic 511 and an ISP 513 are provided as part of the second device 201. The interconnect array 223 of the second device 201 is adapted and configured to physically mate with and electrically connect with the interconnect array 205 of device 1. Similarly, the RF circuit and antenna 503 of the second device 201 are adapted to wirelessly communicate with the RF circuit and antenna 501 of the first device 200. In each device 200, 201, the respective processor 140, 505 is configured, via the computer execution of computer-executable instructions read from a non-transitory computer readable medium, to select either a wired or wireless medium for communications between the devices 200, 201.

In operation, as will be described in greater detail below, when the first device 200 and second device 201 are mated such that the interconnect array 205 of the first device 200 and the interconnect array 223 of the second device 201 are in direct electrical contact, the processor 140 of the first device 100 causes the display 120 of the first device 200 to display an image captured by the camera 215 and processed by the ISP 513 of the second device 201 In this way, the display 120 of the first device 200 acts as a view finder or monitor for the camera 215 of the second device 201. In an alternate embodiment, the ISP 509 of the first device 200 processes the image data received from the second device 201 either after it is first processed by the ISP 513 of the second device 201 or without any processing by the ISP 513 of the second device 201.

When the first device 200 and the second device 201 are separated, the interconnect array 205 of the first device 200 and the interconnect array 223 of the second device 201 are no longer in electrical contact. In this state, the processor 140 of the first device 100 cooperates with the processor 505 of the second device 201 such that the RF circuit and antenna 503 of the second device 201 transmits image data from the camera 215 of the second device 201 to the RF circuit and antenna 501 of the first device 200. In this state, the ISP 513 of the second device 201 may process the image data prior to transmission. The processor 140 of the first device 200 then causes the received image data to be displayed on the display 120 of the first device 200.

The mic 507 of the first device 200 and the mic 511 of the second device 201 may be used to capture audio data in conjunction with captured video data in either the mated or unmated configuration. Thus for example, when the devices are mated, the first device 200 mic 507 and second device 201 mic 511 may cooperate to capture audio linked to a single captured video. When the devices 200, 201 are separated, the second device 201 may transmit both audio data from the mic 511 and image data from the camera 215 to the first device 200 over the wireless link.

Moreover, as mentioned briefly above, the mics 507, 511 may be used to synch image data simultaneously captured on both devices 200, 201. In an embodiment, this is accomplished by synching the audio signals to synch the video signals. In particular, while captured video data taken from different vantage points will typically differ significantly, audio signals captured simultaneously at a scene from different vantage points will simply be scaled versions of each other. As such, synchronizing captured audio is fairly straightforward.

Figure 6:
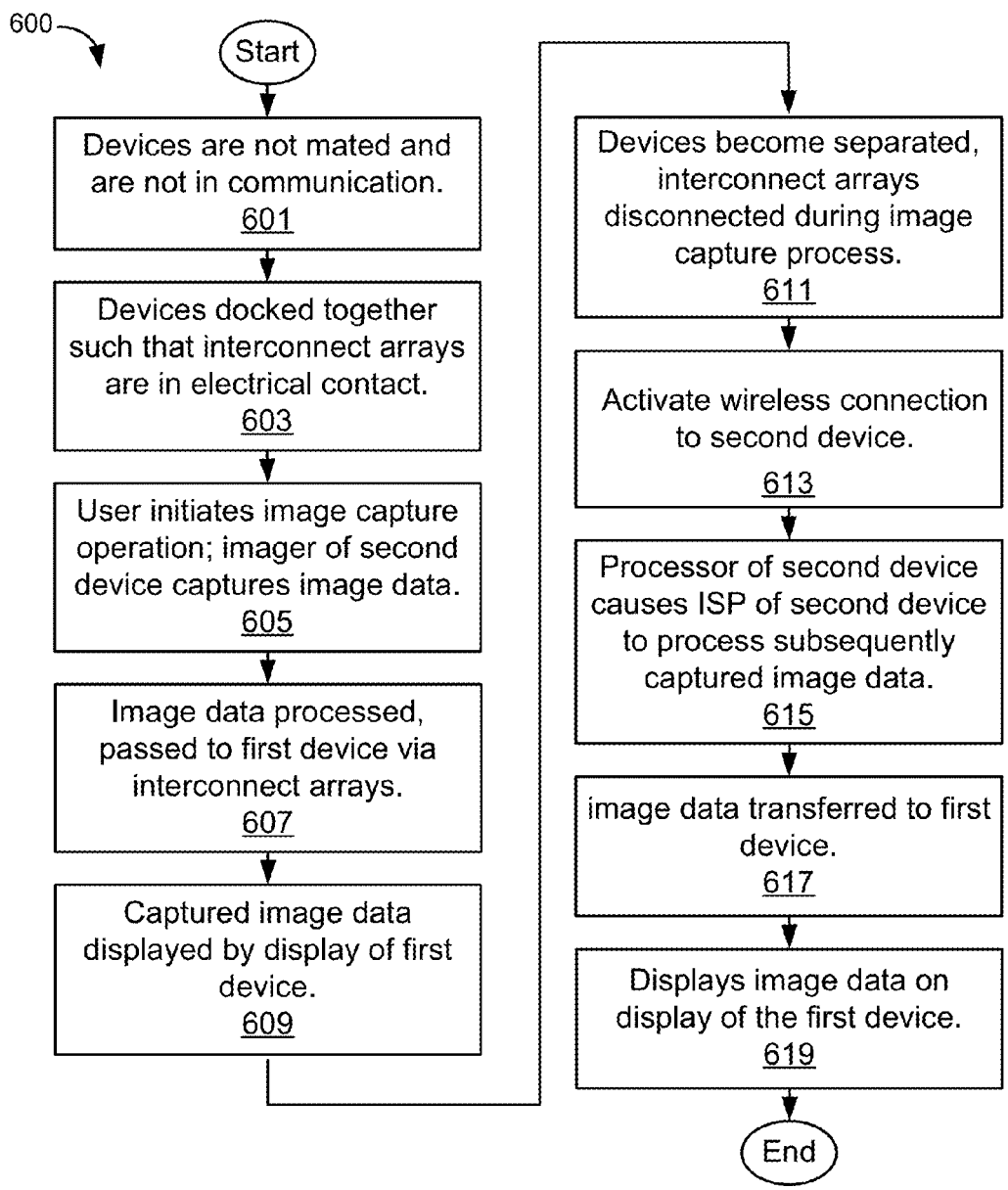
FIG. 6 depicts an exemplary process for remote imaging in a device context such as that described by reference to FIG. 5 in accordance with an embodiment of the disclosed principles.

Continuing, FIG. 6 depicts an exemplary process 600 for remote imaging in a device context such as that described by reference to FIG. 5. Although the process 600 will be described with occasional reference to the specific architecture shown, those of skill in the art will appreciate that other similar architectures may instead be used.

At stage 601 of the illustrated process 600, the devices 200, 201 are not mated and are not in communication with one another. The devices 200, 201 are then docked or placed together at stage 603, such that the respective interconnect arrays 205, 223 are in electrical contact. The processor 140 of the first device 200 detects the linking of the devices 200, 201 and synchs operation with the second device 201. When a user then initiates an image capture operation at stage 605, the camera 215 of the second device 201 captures image data, which is processed by the ISP 513 of the second device 201 and passed to the first device 200 via the respective interconnect arrays 205, 223 at stage 607. The processor 140 of the first device 200 then causes the captured image data to be displayed by the display 120 of the first device 200 at stage 609 of the process 600.

At stage 611, the processor 140 of the first device and the processor 505 of the second device 201 detect that the devices 200, 201 have been physically separated, e.g., by detecting a disconnection of the interconnect arrays 205, 223, while the image capture process is ongoing. In response, the processor 104 of the first device 200 activates a wireless connection to the second device via the respective RF circuits and antennas 501, 503 of the devices 200, 201 at stage 613.

The processor 505 of the second device 200 causes the ISP 513 of the second device 201 to process subsequently captured image data at stage 615, and transfers the processed image data to the first device 200 at stage 617. At stage 619, the processor 104 of the first device 200 displays the captured, processed and transmitted image data on the display 120 of the first device 200. In this way, the display 120 of the first device 200 acts as a view finder for the camera 215 of the second device 201 whether the devices 200, 201 are mated or not. When the devices 200, 201 are not mated, this results in a remote imaging capability.

In an embodiment, the first device 200 also includes a user interface through which the user may control the operation of the second device 201 with respect to the camera 215. During image (video) capture, one or both mics 507, 511 may be active.

Indeed, when both local and remote imaging are ongoing simultaneously, the audio data collected by the mics is used in an embodiment, not only as media, but also to synchronize the two streams of video data. More specifically, because one data stream is locally generated while the other data stream undergoes a wireless transmission, the remotely captured audio/video data will typically be slightly delayed relative to the locally captured audio/video data. This relative delay is referred to as wireless latency.

Various methods may be used to negate the wireless latency using the contemporaneously captured audio data. For example, the delay may be determined by comparing the audio data across streams, and then the determined delay can be added to the locally captured audio/video data. Alternatively, image and/or audio data may be synchronized via a known wireless latency.

It will be appreciated that a system and method for remote imaging have been disclosed herein. However, in view of the many possible embodiments to which the principles of the present disclosure may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. A method for remotely viewing, at a first portable electronic device, visual data captured at a second portable electronic device dockable to the first portable electronic device, wherein the second portable electronic device includes an imager and the first portable device includes a display, the method comprising in order:

detecting user initiation of a visual data capture process at the first portable electronic device while the first portable electronic device and second portable electronic device are docked together such that they conductively exchange data;

receiving at the first portable electronic device visual data from the second portable electronic device while the first portable electronic device and second portable electronic device are docked together and displaying the received visual data on the display of the first portable electronic device;

detecting at the first portable electronic device during the visual data capture process after the first portable electronic device and second portable electronic device have been docked together, that the first and second portable electronic devices have become undocked and are no longer able to conductively exchange data and in response to detecting that the first and second portable electronic devices have become undocked during the visual data capture process;

activating a wireless connection between the first portable electronic device and the second portable electronic device; and receiving at the first portable electronic device via the wireless connection additional visual data from the second portable electronic device and displaying the received additional visual data on the display of the first portable electronic device.

2. The method in accordance with claim 1, wherein the visual data and additional visual data comprise video data.

3. The method in accordance with claim 2, wherein the video data further comprises audio data.

4. The method in accordance with claim 1, wherein the visual data and additional visual data comprise still image data.

5. The method in accordance with claim 1, wherein the first portable electronic device includes a first image signal processor (ISP) and the second portable electronic device includes a second ISP, and wherein receiving visual data and additional visual data from the second portable electronic device includes receiving visual data processed by the second ISP.

6. The method in accordance with claim 5, wherein receiving visual data and additional visual data from the second portable electronic device further comprises processing the received visual data via the first ISP.

7. The method in accordance with claim 1, wherein the first device also includes an imager and wherein the method further comprises capturing a first video data stream at the first portable electronic device via the imager of the first portable electronic device while receiving a second video data stream at the first portable electronic device via the wireless connection from the second portable electronic device.

8. The method in accordance with claim 7, wherein both portable electronic devices include a mic, and wherein each video data stream includes audio data.

9. The method in accordance with claim 8, further comprising synchronizing the video data streams via the audio data contained in each video data stream.

10. A portable electronic device for remotely viewing video comprising:

a display screen;

an interconnection array configured to conductively mate to an interconnection array of a separate portable electronic device;

a wireless connection module configured to wirelessly communicate with a wireless connection module associated with the separate portable electronic device; and a processor configured to detect user initiation of a visual data capture process while the separate portable electronic device is connected to the portable electronic device via the interconnection array, receive visual data from the separate portable electronic device via the interconnection array, display the visual data on the display, detect that the separate portable electronic device is no longer connected to the portable electronic device via the interconnection array during the visual data capture process, and in response to detecting that the separate portable electronic device is no longer connected to the portable electronic device via the interconnection array during the visual data capture process:

activate a wireless connection between the portable electronic device and the separate portable electronic device, and receive additional visual data from the separate portable electronic device via the wireless connection and display the received additional visual data on the display.

11. The portable electronic device in accordance with claim 10, wherein the visual data and additional visual data comprise video data.

12. The portable electronic device in accordance with claim 11, wherein the video data further comprises audio data.

13. The portable electronic device in accordance with claim 10, wherein the visual data and additional visual data comprise still image data.

14. The portable electronic device in accordance with claim 10, wherein receiving visual data via the interconnection array includes receiving visual data already processed by an image signal processor (ISP).

15. The portable electronic device in accordance with claim 14, further comprising an ISP and wherein the processor is further configured to process via its ISP the visual data and additional visual data received from the separate portable electronic device via the wireless connection.

16. The portable electronic device in accordance with claim 11, further comprising an imager and wherein the processor is further configured to capture a first video data stream via the imager while receiving a second video data stream via the wireless connection.

17. The portable electronic device in accordance with claim 16, wherein the first video data stream and the second video data stream include audio data.

18. The portable electronic device in accordance with claim 17, wherein the processor is further configured to synchronize the first and second video data streams via the audio data contained in each video data stream.

19. A remote imaging system comprising:
  a first portable electronic device having a first processor, a display and a first conductive connector array; and
  a second portable electronic device having a second processor, a camera, an image signal processor (ISP) and a second conductive connector array;
  wherein the first processor is configured to display video data captured by the camera and processed by the ISP when the first conductive connector array and second conductive connector array are connected, and to display video data captured by the camera and processed by the same ISP when the first conductive connector array and second conductive connector array are disconnected during an image capture operation after having been connected.

20. The remote imaging system in accordance with claim 19, wherein the first portable electronic device further comprises a first wireless connection module and the second portable electronic device further comprises a second wireless connection module, and wherein the first processor is further configured to support a wireless connection for transmitting said video data between the first wireless connection module and the second wireless connection module when the first conductive connector array and second conductive connector array are disconnected during an image capture operation after having been connected.

* * * * *